(12) United States Patent
Hyun et al.

(10) Patent No.: US 8,403,004 B2
(45) Date of Patent: *Mar. 26, 2013

(54) VARIABLE FLOW RATE CONTROLLER

(75) Inventors: Dongchul D. Hyun, Brea, CA (US); Michael Fleury, Brea, CA (US)

(73) Assignee: Medical Product Specialists, Brea, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/354,081

(22) Filed: Jan. 19, 2012

(65) Prior Publication Data

US 2012/0118413 A1  May 17, 2012

Related U.S. Application Data

(63) Continuation of application No. 12/214,473, filed on Jun. 19, 2008, now Pat. No. 8,118,061.

(51) Int. Cl.
*F16K 11/16* (2006.01)

(52) U.S. Cl. ................ 137/630.2; 137/599.06

(58) Field of Classification Search .......... 251/262, 251/263, 282, 309; 137/8, 599.01, 599.06, 137/601.01, 601.02, 601.12, 601.15, 601.18, 137/628, 630.16, 630.17, 630.19, 630.2
See application file for complete search history.

(56) References Cited

U.S. PATENT DOCUMENTS

| | | | |
|---|---|---|---|
| 3,298,367 A | | 1/1967 | Bergman |
| 3,325,143 A | * | 6/1967 | Phillips ......................... 251/311 |
| 3,682,200 A | * | 8/1972 | Deve ......................... 137/625.47 |
| 3,878,869 A | | 4/1975 | Yamanouchi |
| 3,993,099 A | * | 11/1976 | Nightingale ............. 137/625.48 |
| 4,210,178 A | * | 7/1980 | Morse et al. ............... 137/625.5 |
| 4,425,113 A | * | 1/1984 | Bilstad ......................... 604/6.04 |
| 4,425,116 A | | 1/1984 | Bilstad et al. |
| 4,535,969 A | * | 8/1985 | Riley ............................. 251/215 |
| 4,559,036 A | | 12/1985 | Wunsch |
| 4,697,785 A | | 10/1987 | Tuseth |
| 4,742,848 A | | 5/1988 | Black |
| 4,822,344 A | | 4/1989 | O'Boyle |
| 4,950,255 A | | 8/1990 | Brown et al. |
| 4,966,579 A | | 10/1990 | Polaschegg |
| 4,976,687 A | | 12/1990 | Martin |
| 5,006,997 A | | 4/1991 | Reich |
| 5,009,251 A | | 4/1991 | Pike et al. |
| 5,113,906 A | | 5/1992 | Hogner |
| 5,318,515 A | | 6/1994 | Wilk |
| 5,529,214 A | | 6/1996 | Lasonde et al. |

(Continued)

FOREIGN PATENT DOCUMENTS

| | | |
|---|---|---|
| AU | 24378 | 4/1978 |
| DE | 4036509 | 2/1992 |

(Continued)

*Primary Examiner* — John K Fristoe, Jr.
*Assistant Examiner* — Matthew W Jellett
(74) *Attorney, Agent, or Firm* — Stetina Brunda Garred & Brucker

(57) ABSTRACT

A variable flow rate controller is provided herein. The controller may have a linearly traversable switch such that the controller is primed to flush air bubbles out of the fluid system of the controller prior to administering fluidic medication to a patient. Moreover, the controller may have a plurality of valves which may be independently opened and closed by a caming surface. To close the valve, a first seal may be disposed between offset inlet and outlet to prevent fluid from flowing from the inlet to the outlet. To open the valve, the first seal is disposed on one side of both of the inlet and outlet. Fluid if permitted to flow from the inlet to the outlet.

9 Claims, 5 Drawing Sheets

U.S. PATENT DOCUMENTS

| | | |
|---|---|---|
| 5,584,320 A | 12/1996 | Skinkle et al. |
| 5,718,409 A * | 2/1998 | Starchevich .................. 251/6 |
| 5,901,745 A | 5/1999 | Buchtel |
| 5,925,023 A | 7/1999 | Hiejima |
| 6,367,502 B1 | 4/2002 | Kanai et al. |
| 6,648,017 B2 | 11/2003 | Lama et al. |
| 6,926,706 B1 * | 8/2005 | Sealfon ..................... 604/500 |
| 6,979,315 B2 * | 12/2005 | Rogers et al. ............... 604/151 |
| 7,318,814 B2 * | 1/2008 | Levine et al. ................ 604/33 |
| 7,661,440 B2 * | 2/2010 | Mabry et al. ............ 137/599.06 |
| 7,690,396 B2 * | 4/2010 | Oh et al. ................... 137/625.3 |
| 8,118,061 B2 | 2/2012 | Hyun et al. |
| 2006/0070669 A1 | 4/2006 | Mabry et al. |

FOREIGN PATENT DOCUMENTS

| | | |
|---|---|---|
| EP | 0836859 | 4/1998 |
| EP | 1086715 | 3/2001 |
| WO | WO8102980 | 10/1981 |
| WO | WO9113641 | 9/1991 |

* cited by examiner

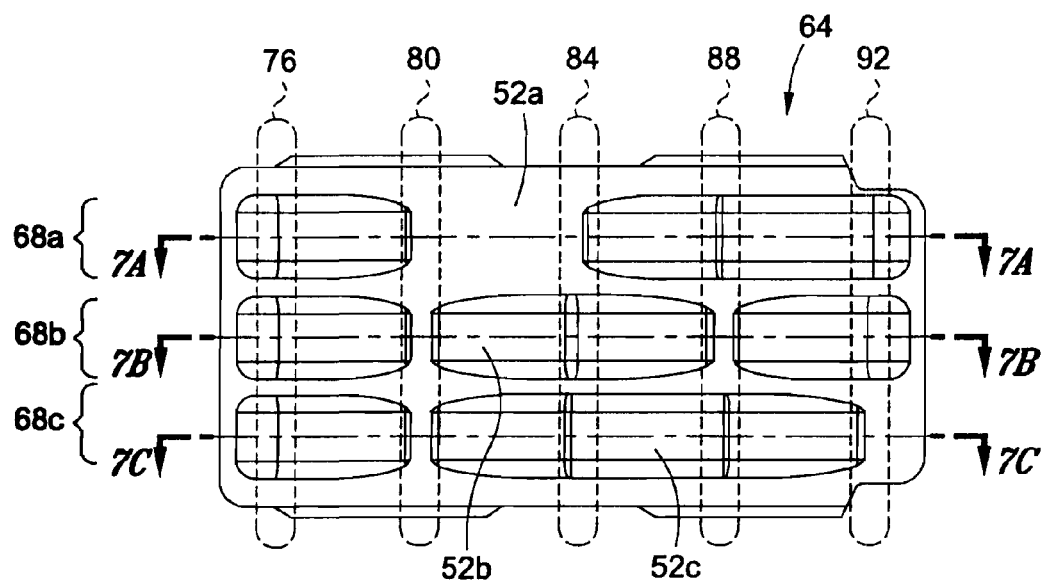
Fig. 6
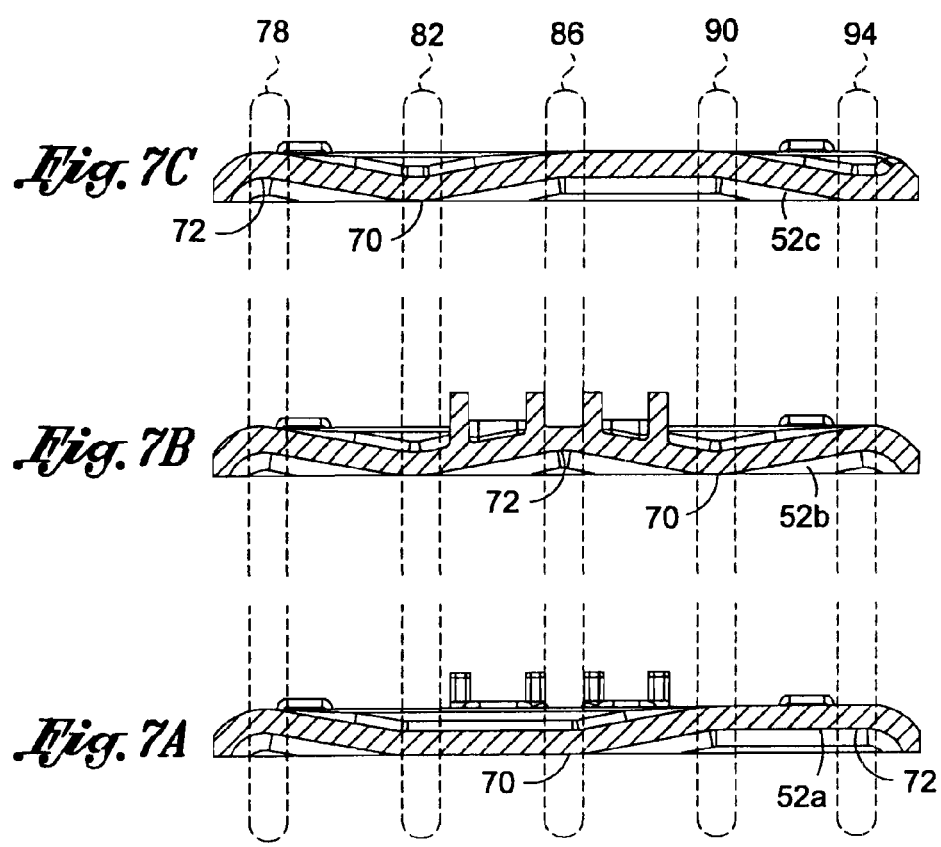
Fig. 7C
Fig. 7B
Fig. 7A

VARIABLE FLOW RATE CONTROLLER

CROSS-REFERENCE TO RELATED APPLICATIONS

The present application is a continuation of U.S. application Ser. No. 12/214,473 filed Jun. 19, 2008 now U.S. Pat. No. 8,118,061, the entire contents of which is incorporated herein by reference.

STATEMENT RE: FEDERALLY SPONSORED RESEARCH/DEVELOPMENT

Not Applicable

BACKGROUND

The present invention relates to a variable flow rate controller.

In the medical field, it is desirable to flow fluid into a patient at a particular flow rate. A universal fluid regulator that permits the medical professional to select a particular flow rate at the time of administering the fluidic medication is optimal. The reason is that the patient's condition may change requiring a different flow rate of the fluidic medication when a medical professional administers the fluidic medication. Accordingly, it is desirable to permit the medical professional to select the appropriate rate of fluid flow. Moreover, while administering the fluidic medication, it may be desirable to alter the rate of fluid flow into the patient. To this end, a variable regulator that permits the medical professional to alter the rate of fluid flow to the patient without having to switch out any components is optimal.

U.S. Publication No. 2006/0070669 disclosed by Mabry, et al. discloses a device for selectively regulating the flow rate of a fluid. The device has a plurality of flow tubes associated with a different flow rate. The fluid flowing through the flow tubes may be blocked or permitted to flow through the flow tubes by pinching the flow tubes with a flow blocking element, as understood. To set a particular flow rate, one or more of the flow tubes are permitted to allow fluid to combine and flow therethrough. Accordingly, the flow rate of the fluid through the device is set by one or more of a combination of flow tubes. Moreover, it appears that the device of Mabry, et al. is controlled by a rotating handle. The rotating handle may be rotated 360 degrees to selectively set the particular flow rate of the regulating device.

U.S. Pat. No. 5,318,515, issued to Wilk also discloses a device for regulating fluid flow into a patient. However, it appears that the device flows fluid intravenously into the patient. Similar to the Mabry device, the flow rate of fluid through the regulating device is set by opening one or more fluid paths. Additionally, it appears that the fluid paths are closed or open by pinching the flow tubes. Unfortunately, the flow rate must be calculated by the medical professional thereby leading to potential human error.

Accordingly, there is a need in the art for an improved variable flow rate controller.

BRIEF SUMMARY

The controller discussed herein addresses the deficiencies noted above, discussed below and those that are known in the art. The controller is operative to deliver a consistent flow of fluid to a patient at a rate selected by a medical professional. To this end, a switch of the controller may be linearly traversed to the particular flow rate desired by the medical professional. Prior to traversing the switch to the particular flow rate, the switch may be traversed to a prime position which flows fluid throughout the entire fluid system of the controller to remove air bubbles from the fluid system. In an aspect of the controller, from the off position, the switch may be traversed to one of the flow rates usable on a patient only after the switch is traversed to the prime position.

The controller may have a fluid system comprising a plurality of valves. All of the valves may be closed in which case the controller is in the off position. Prior to using the controller to control a flow rate of fluid to a patient, the fluid system is primed by flushing air bubbles out of the fluid system by opening all of the valves and allowing fluid to flow throughout the entire fluid system for a period of time. After the fluid system has been flushed of air bubbles, the switch may be traversed to one of the regulated flow rates. When the switch is traversed to one of the regulated flow rates, one of the plurality of valves is open while the remaining valves are closed. Fluid is permitted to flow through the open valve but prevented from flowing through the closed valve. A flow restrictor is connected to the outlet of the open valve and has a predefined flow rate. The fluid flowing through the open valve flows through the flow restrictor at a particular flow rate. To increase or decrease the flow rate of fluid flowing through the controller, the switch may be linearly traversed to a different flow rate position. This closes the open valve and opens a different valve having a different flow restrictor connected to the outlet thereof. Such different flow restrictor may have a different fluid flow rate associated therewith. The fluid now flows through the controller at the flow rate defined by such flow restrictor.

The valve may have offset inlet and outlet. To close the valve, a first seal may be disposed between the inlet and outlet to block any fluid from flowing from the inlet to the outlet. To prevent any leakage into the controller, a second seal may be disposed on the opposite side of the inlet with respect to the first seal. Accordingly, the first seal prevents fluid from flowing from the inlet to the outlet while the second seal prevents the fluid from flowing from the inlet onto other components of the controller. To open the valve, the first seal is disposed on one side of both the offset inlet and outlet while the second seal is disposed on the opposite side of both the offset inlet and outlet with respect to the first seal. The first and second seals provide a closed fluid path to direct fluid from the inlet to the outlet. The first and second seals may be traversed as discussed above with a earning surface attached to the switch.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 6 is a bottom view of a cam illustrating a plurality of earning tracks operative to traverse the valve between closed and open positions;

FIG. 7A is a cross sectional view of a first caming track of the caming surface shown in FIG. 6;

FIG. 7B is a cross sectional view of a second caming track of the caming surface shown in FIG. 6;

FIG. 7C is a cross sectional view of a third caming track of the caming surface shown in FIG. 6;

DETAILED DESCRIPTION

Figure 1:
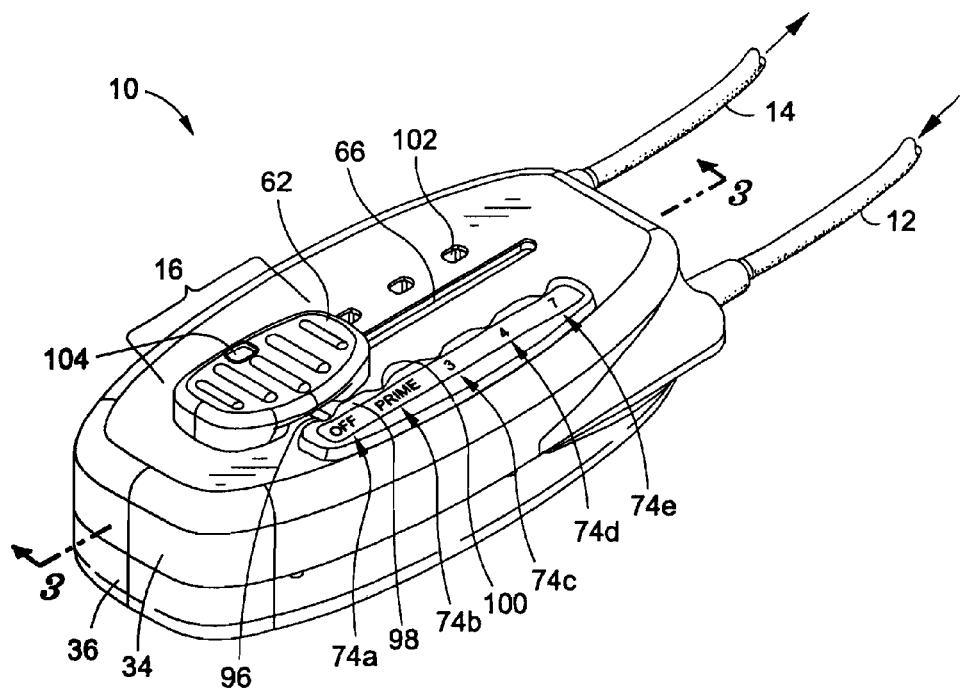
FIG. 1 is a perspective view of a variable flow rate controller.

Referring now to FIG. 1, a perspective view of a variable flow rate controller 10 is shown. The variable flow rate controller 10 controls the flow rate of fluid flowing through an inlet 12 to an outlet 14. The flow rate of the fluid is controlled by a linearly traversable switch 16 that can be positioned to an off position 74a (see FIG. 1), a prime position 74b and two or more different regulated fluid flow rates 74c-e. As shown in FIG. 1, the flow rate of the fluid flowing through the inlet 12 and outlet 14 may be set at either three, four or five ml/hour. However, it is also contemplated that the controller 10 may control the rate of fluid flow at various other specific flow rates and also at two or more different flow rates. When the switch 16 is at the prime position, the fluid flows throughout the entire fluid system 18 (see FIG. 2) to remove air bubbles within the fluid system 18.

In an aspect of the controller, from the off position 74a, the switch 16 may be traversable to the different fluid flow rates after the switch 16 is traversed to the prime position 74b. During use, the operator or medical professional traverses the switch 16 to the prime position 74b to remove air bubbles from the fluid system 18. After the switch 16 is traversed to the prime position 74b and the air bubbles from the fluid system 18 are removed, the switch 16 may be traversed to a regulated flow rate 74c-e and the outlet 14 may be connected to the patient so as to deliver fluid to the patient. In this manner, the fluid system 18 is flushed of air bubbles prior to use on a patient. Since the switch 16 must cross the prime position prior to the regulated positions (i.e., three, four or five ml/hour), the controller 10 promotes flushing of air bubbles out of the fluid system 18 thereby also promoting safe use of the controller 10.

The controller 10 varies the flow rate of the fluid when the outlet 14 is connected to the patient by allowing one valve 20 (see FIG. 2) of a plurality of valves 20a-c to be traversed to an open position. Each of the plurality of valves 20 is connected to a flow restrictor 22a-c associated with a different fluid flow rate. Accordingly, the open valve 20 permits fluid to flow through the valve and into a particular flow restrictor 22 associated with a particular fluid flow rate. To change the fluid flow rate through the inlet 12 and out the outlet 14, a different valve 20 is opened and the remaining valves 20 are closed such that the open valve 20 is now associated with a different flow restrictor 22 having a different fluid flow rate.

Figure 3:
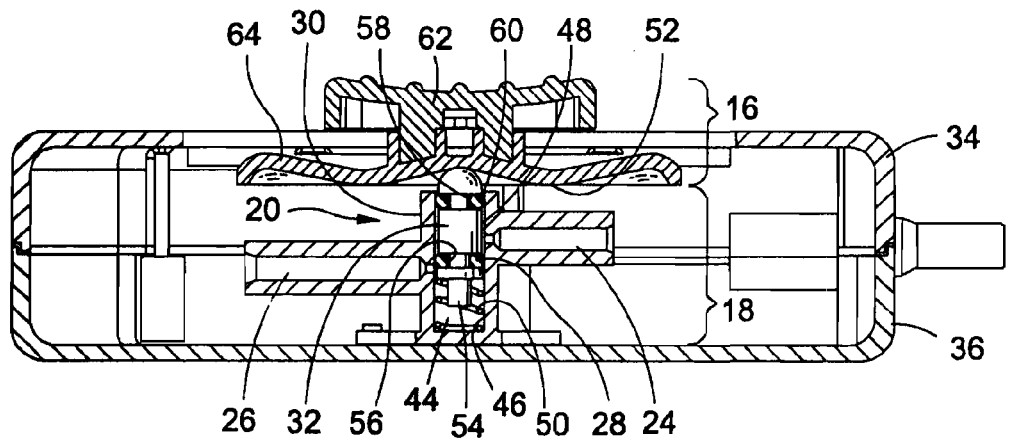
FIG. 3 is a cross sectional view of a closed valve within the controller shown in FIG. 1.
Figure 4:
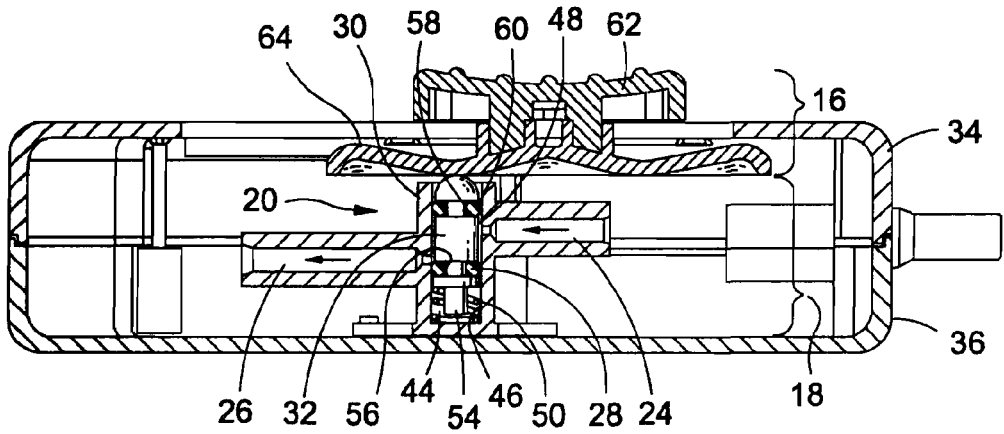
FIG. 4 is a cross sectional view of the valve shown in FIG. 3 in an open position.

As shown in FIG. 3, each of the valves 20 may have an inlet 24 and an outlet 26. The inlet and outlets 24, 26 are offset from each other a sufficient distance such that a first seal 28 is interposable between the offset inlet 24 and outlet 26, as shown in FIG. 3. In this manner, as the fluid flows through the inlet 24, the fluid is blocked by the first seal 28 from flowing to the outlet 26. A second seal 60 prevents fluid from leaking onto other components of the controller 10, as further discussed below. To open the valve 20, the first seal 28 is also disposable on one side of both the inlet 24 and outlet 26 of the valve 20, as shown in FIG. 4. The fluid is permitted to flow through the inlet 24, through a gap between a cylinder 30 and a piston 32 and out of the outlet 26. Based on the foregoing discussion, the valve 20 either (1) physically blocks the fluid flow path between the inlet 24 and the outlet 26 of the valve 20 to prevent fluid flow through the valve 20 (i.e., first seal interposed between the offset inlet and outlet 24, 26; see FIG. 3) or (2) physically removes the first seal 28 from the fluid flow path (i.e., first seal disposed to one side of both the offset inlet and outlet 24, 26; see FIG. 4) to permit fluid to flow from the inlet 24 to the outlet 26 of the valve 20.

As shown in FIG. 1, the variable flow rate controller 10 may have an upper housing 34 and a lower housing 36. The upper and lower housings 34, 36 may be attached to each other with screws, nuts and bolts, adhesives, sonic welding, etc. and other attachment methods known in the art and/or developed in the future. The upper and lower housings 34, 36 define an interior. The fluid system 18 may be enclosed or contained in the interior between the upper and lower housings 34, 36, as shown in FIG. 3.

Figure 2:
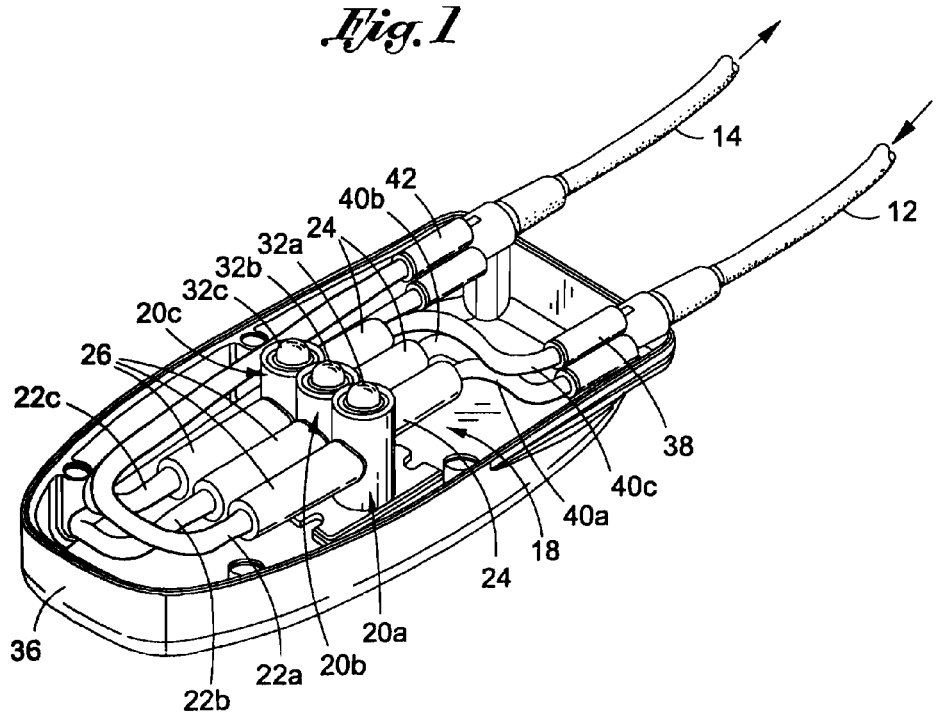
FIG. 2 is a perspective view of a fluid system disposed within a lower housing.

Referring now to FIG. 2, the fluid system 18 may comprise an inlet manifold 38 which is fluidically connected to the inlet 12 of the controller 10. The inlet manifold 38 separates the fluid flowing through the inlet 12 into three separate streams of fluid flowing into three flexible tubes 40a-c. Each of the flexible tubes 40a-c is connected to a respective valve 20a-c, and more particularly, to the inlets 24 of the respective valves 20a-c. The outlets 26 of the valves 20a-c are fluidically connected to respective flow restrictors 22a-c. Preferably, the flow restrictor 22 may be a flexible tubing with an inner diameter that defines the fluid flow rate through the tubing. The tubing of the flow restrictor 22 may have the same length as the other flexible tubing of the other flow restrictors 22 such that the flow rate of the fluid flowing through the flexible tubing is dependent primarily upon the size of the inside diameter of the flexible tubing and not on the length of the flexible tubing. The flow restrictors 22a-c are then connected to an outlet manifold 42 which is subsequently connected to the outlet 14. When the switch 16 is positioned at the prime position, fluid flows through all of the valves 20 to remove air out of the fluid system 18. When the switch 16 is traversed to one of the regulated flow rates 74c-e (three, four or five ml/hour), a respective one of the valves 20a-c is open and the remaining valves 20 are closed. Preferably, fluid will only flow through that open valve 20 into the respective flow restrictor 22 and out of the outlet manifold 42 and outlet 14.

Referring now to FIG. 3, each of the valves 20 may have an inlet 24 and an outlet 26 which are offset from each other. The inlet and outlets 24, 26 may be formed in the cylinder 30. The cylinder 30 may have an interior cavity 44 defined by an inner cylindrical surface 46. The piston 32 may be slidably disposed within the interior cavity 44. The piston 32 may be smaller than the inner cylindrical surface 46 such that there is a gap between the outer surface 48 of the piston 32 and the inner cylindrical surface 46 of the cylinder 30. Accordingly, the piston 32 may slide longitudinally within the cylinder 30. A spring 50 may be disposed in the interior cavity 44 under the piston 32. Preferably, the spring 50 is a compression spring with ends that are closed and ground. The spring 50 biases the piston 32 against a caming surface 52. As the switch 16 is linearly traversed, the caming surface 52 may push the piston 32 further into the cylinder 30 or allow the spring 50 to push the piston 32 out of the cylinder 30 to either open or close the valve 20. More particularly, the lower portion of the piston 32 may have a nab 54 sized and configured to be disposable within the end hole of the spring 50. With the spring 50 in the interior cavity 44 of the cylinder 30, the piston 32 may be disposed within the interior cavity 44 of the cylinder 30. As the piston 32 is further inserted into the cylinder 30, the nub 54 is inserted into the open end of the spring 50. The nub 54 assists in maintaining the location of the spring 50.

The first seal 28 may be disposed within a first groove 56. The first groove 56 may be an undercut about the circumference of the piston 32. A second groove 58 may be gapped away from the first groove 56. The second seal 60 may be disposed within the second groove 58. The first and second seals 28, 60 may form a fluid tight seal between the cylinder 30 and the piston 32. As shown in FIG. 3, the first seal is disposable between the offset inlet 24 and outlet 26. The second seal 60 may be disposed above both of the offset inlet and outlet 24, 26. Since there is a gap between the piston and the cylinder 32, the fluid flows into the gap from the inlet 24 and is blocked from flowing to the outlet 26 by the first seal. The second seal 60 prevents the fluid from flowing out of the top of the cylinder 30 and contaminate other components of the controller 10. At this position, the valve 20 is in the closed position. No fluid flows through this valve 20. In contrast, as shown in FIG. 4, the first seal 28 may be disposed on one side of both the inlet and outlet 24, 26. Also, the second seal 60 may be disposed on the other side of both the inlet and outlet 24, 26. Accordingly, during use, the fluid may flow through the inlet 24, and into the gap between the piston 32 and the cylinder 30. The first seal 28 does not block the fluid from exiting out of the outlet 26. Rather, the first seal 28 is physically displaced or removed from the flow path of the fluid such that the fluid may flow through and out of the outlet 26. The first and second seals 28, 60 provide a closed fluid path in which the fluid entering via the inlet 24 may enter the gap between the piston 32 and the cylinder 30 and exit out of the outlet 26.

As shown in FIG. 3, the switch 16 may comprise a handle portion 62 and a cam 64. The handle portion 62 may be operated by a hand, or finger. The handle portion 62 may be disposed external to the upper housing 34. The cam 64 may be disposed internal to the upper and lower housings 34, 36. Also, the cam 64 may be physically attached to the handle portion 62. As shown in FIG. 1, the upper housing may have a linear slot 66. The underside of the handle portion 62 and the upper side of the cam 64 may be attached to each other through the linear slot 66. Accordingly, when the handle portion 62 is linearly traversed across the linear slot 66, the cam 64 is linearly traversed in a corresponding manner.

Figure 5:
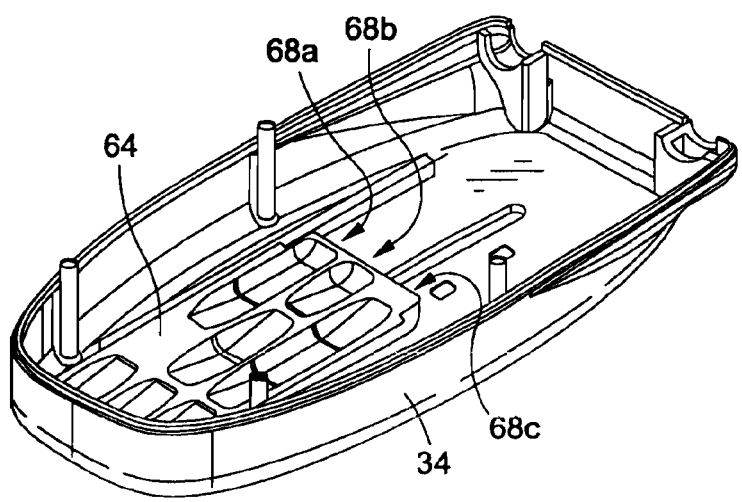
FIG. 5 is a bottom perspective view of an upper housing illustrating its underside.

Referring now to FIG. 5 which illustrates the underside of the upper housing 34 and the cam 64. The underside surface of the cam 64 may have one or more caming tracks 68a-c (see FIGS. 5 and 6). Each of the earning tracks 68a-c may be aligned to one of the pistons 32a-c (see FIG. 2) of the valves 20a-c. More particularly, if the upper housing 34 shown in FIG. 5 is assembled to the lower housing 36 shown in FIG. 2, then earning track 68a would coincide with the piston 32a, the earning track 68b would coincide with the piston 32b and the earning track 68c would coincide with the piston 32c. The earning tracks 68a-c may each have a different configuration for its caming surface, as shown in FIGS. 6-7C. Referring now to FIGS. 6 to 7C, the configuration of the earning surface 52a, b, and c of each of the earning tracks 68a, b, and c will be discussed. Each of the earning surfaces 52a, b, and c may have a plurality of peaks 70 and valleys 72. These peaks and valleys 70, 72 correspond to a particular position 74a-e of the switch 16 shown in FIG. 1. As the switch 16 is traversed across the linear slot 66, the pistons 32a-c which are biased against the earning surfaces 52a-c are traversed up and down based on the specific profile of the earning surfaces 52a-c associated with the earning tracks 68a-c. More particularly, when the switch 16 is in the off position 74a as shown in FIG. 1, the pistons 32a-c contact the earning surfaces 52a, b, and c indicated by the dashed box 76 in FIGS. 6 and 78 in Figures A, B and C. The spring 50 biases the pistons 32 upward such that the first seal 28 is interposed between the offset inlet 24 and outlet 26. All valves are closed and no fluid flows through the controller 10. When the switch 16 is traversed to the prime position 74b, the pistons 32a-c are biased against the earning surfaces 52a, b, and c at box 80 shown in FIGS. 6 and 82 shown in FIGS. 7A, B and C. In this position, the earning surfaces 52a, b, and c pushes the pistons 32a-c of the valves 20a-c downward such that the first seal 28 is disposed on one side of both the inlets and outlets 24, 26 and the second seal 60 is disposed on the other side of both the inlets and outlets 24, 26. All valves 20 are open and fluid flows through the entire fluid system 18 to flush the fluid system 18 of air bubbles.

In an aspect of the controller, from the off position 74a, the switch 16 is traversed to the positions 74c, d, and e after the switch 16 is traversed to the prime position 74b. When the switch 16 is traversed to position 74c, the pistons 32a-c are biased against the earning surfaces at box 84 shown in FIG. 6 and box 86 in FIGS. 7A, B and C. As can be seen from FIGS. 7A-C, only the piston 32a is pushed down and the remaining pistons 32b and c are biased upward. The valve 20a is open and permits fluid to flow through the fluid system 18 only through the valve 20a. Fluid flows only through flow restrictor 22a having a particular inner diameter to allow only a regulated rate of fluid to flow therethrough. When the switch 16 is traversed to the position 74d, the pistons 32a-c now are biased against the caming surfaces 52a, b and c at the position shown by box 88 in FIGS. 6 and 90 in FIGS. 7A-C. In this position, only valve 20b is open. Fluid flows through the inlet 12, the flexible tubing 40b, valve 20b, flow restrictor 22b and out the outlet manifold 42 and outlet 14. When the switch is traversed to the position 74e, the pistons 32a-c are biased against the caming surface 52a-c at the position shown by box 92 in FIGS. 6 and 94 in FIGS. 7A-C. In this position, only valve 20c is open. From the foregoing discussion, in an aspect of the controller 10, only one valve 20 of the plurality of valves 20a-c in the fluid system 18 may be open during use of the controller 10 on a patient. Prior to using the controller 10 with a patient, the fluid system 18 may be flushed of air bubbles by traversing the switch 16 to the prime position. All valves are open and fluid is flushed through the entire fluid system 18.

The switch 16 may further comprise an indicator 96 (see FIG. 1). The indicator 96 not only indicates the position of the switch 16 but may also bias the switch 16 to the indicated position 74a, b, c, d or e. The indicator 96 may be attached to the handle portion 62. The indicator 96 may have a long slender body that extends outside of the periphery of the handle portion 62, as shown in FIG. 1. As the switch 16 is traversed in the linear slot 66, the indicator 96 bends over the nub 98 and snaps into the valley 100 to hold the switch 16 at a particular position 74a-e. The indicator 96 may be positioned in any one of the valleys 100.

Figure 8:
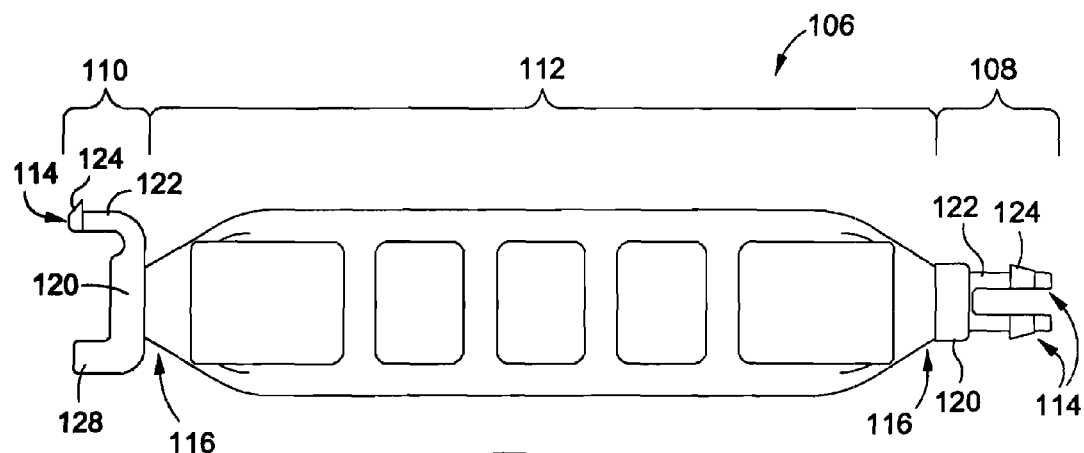
FIG. 8 is a side view of a tool for locking in a particular flow rate or locking out the prime and off positions of the controller shown in FIG. 1.
Figure 9:
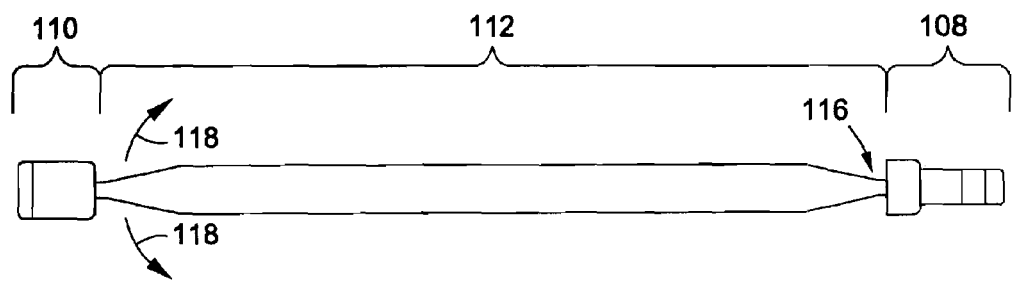
FIG. 9 is a front view of the tool shown in FIG. 8.

Referring now to FIGS. 8-11 and FIG. 1, a means for locking in a particular flow rate 74c-e of fluid or locking out the prime and off positions 74a, b is shown. In particular, the upper housing 34 (see FIG. 1) may have a plurality of apertures 102 positioned to correspond to the prime position 74b and the various other regulated flow rate positions 74c-e. The switch 16, and more particularly, the handle portion 62 of the switch 16 may have an aperture 104. FIG. 8 illustrates a tool 106 having a pin 108 and a gripping portion 112 to lock in a particular flow rate. The switch 16 may be traversed to the desired flow rate 74*c-e* such that the indicator 96 is pointing to the desired flow rate. At this position, the aperture 104 of the handle portion 62 is aligned to a respective aperture 102 of the upper housing 34. The pin 108 of the tool 106 may be inserted into the aperture 104 of the handle portion 62 and further inserted into the aperture 102 of the upper housing 34. The pin 108 may have outwardly extending hooks 114 that holds the pin 108 in position in both the aperture 104 of the handle portion 62 and the aperture 102 of the upper housing 104. In this manner, the switch 16 cannot be linearly traversed to the left or to the right. Rather, the particular flow rate indicated by the switch 16 is locked in. A patient cannot alter the flow rate of the controller 10. Preferably, the tool 106 has a frangible area 116 between the gripping portion 112 and the pin 108. After the pin 108 is inserted into the apertures 104 of the handle portion 62 and the aperture 102 of the upper housing 34, the gripping portion 112 is separated from the pin 108 thereby leaving the pin 108 within both the aperture 104 of the handle portion 62 and the aperture 102 of the upper housing 34. The gripping portion 112 does not awkwardly protrude out of the controller 10 during use. The frangible area 116 may be a thinner portion, as shown in FIG. 9. The gripping portion 112 may be separated from the pin 108 by bending the gripping portion 112 in the direction shown by arrow 118 in FIG. 9. After bending the gripping portion 112, the frangible area 116 will become weak and eventually break thereby separating the gripping portion 112 from the pin 108.

Referring now to FIG. 8, the pin 108 may have two outwardly extending hooks 114. Each of the hooks 114 may be attached to a base portion 120 which is immediately adjacent the frangible area 116. The base portion 120 is sufficiently rigid so as to support the hooks 114. Each of the hooks 114 may have an elongate stem 122 and oppositely facing barbs 124. The barbs 124 may face away from each other. The barbs 124 may have a tapered front surface to push each of the hooks 114 inward closer to each other as the pin 108 is being inserted into the aperture 104 of the handle portion 62. The aperture 104 of the handle portion 62 may have a funnel shaped entrance to provide ease of insertion of the pin 108 into the apertures 104, 102. As the pin 108 is being inserted into the apertures 104, 102, the hooks 114 bend closer to each other. At some point during the insertion process, the hooks 114 expand outward to maintain the pin 108 within both the apertures 104, 102 such that the particular flow rate desired is locked in and cannot be changed. Preferably, the hooks 114 extend outward and the barbs 124 engage the upper housing 34, as shown in FIG. 11. The barbs 124 of the hooks 114 may be seated in indentations formed in the upper housing 34. The base portion 120 may be seated within the aperture, as shown in FIG. 10.

Figure 10:
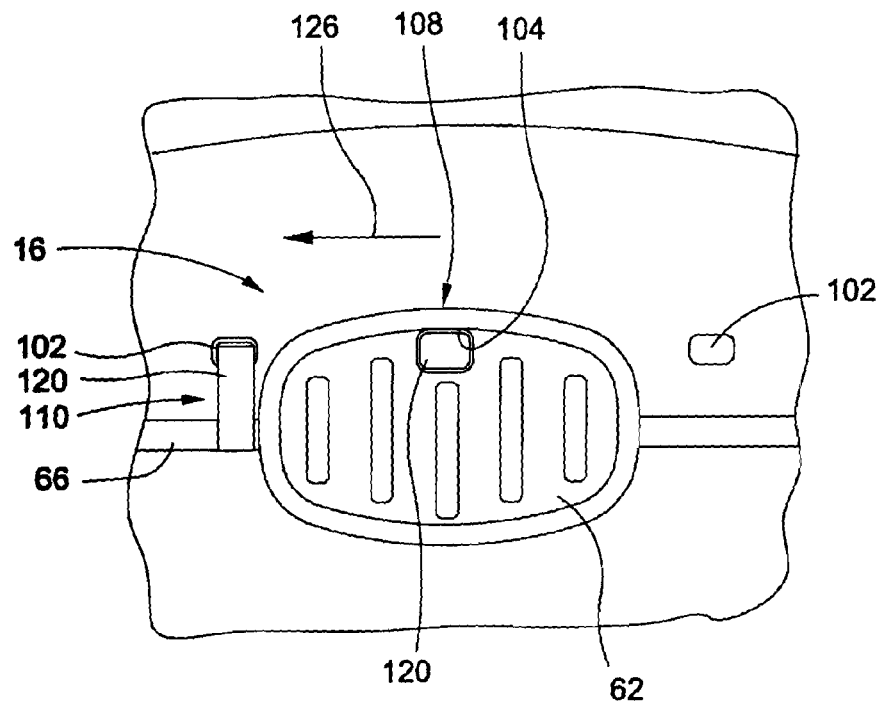
FIG. 10 is an enlarged view of a switch and the upper housing shown in FIG. 1 with a pin and clip to lock in a particular flow rate and to lock out the off and prime positions.
Figure 11:
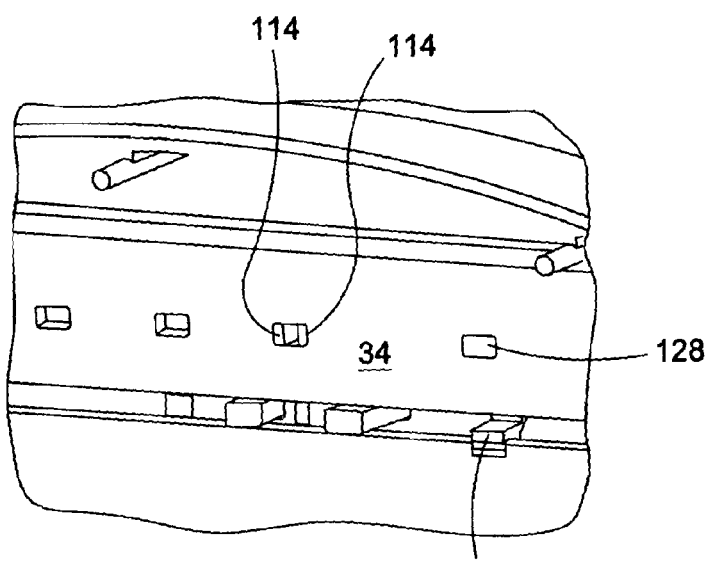
FIG. 11 is a bottom perspective view of the upper housing illustrating operation of the pin and clip.

To lock out the off and prime positions, when the switch 16 is traversed to one of the flow rates usable with a patient, an aperture 102 may be exposed, as shown in FIG. 10. To lock out the off and prime positions, the clip 110 is inserted into the aperture 102 and in the slot 66, as shown in FIG. 10. The handle portion 62 cannot be pushed in the direction of arrow 126 as shown in FIG. 10. After the clip 110 is inserted into the aperture 102 and slot 66, the frangible portion 116 between the clip 110 and the gripping portion 112 is broken so as to separate the clip 110 from the gripping portion 112.

More particularly, as shown in FIG. 8, the clip 110 may have a hook 114. The hook 114 may have a barb 124 and a stem 122. The stem 122 may be attached to a base portion 120 which is subsequently attached to a post 128. To insert the clip 110 into the aperture 102 and the slot 66, the hook 114 is inserted into the slot 66 and the post 128 is inserted into the aperture 102. The barb 124 seats into an indentation formed in the upper housing 34 to prevent the clip 110 from inadvertently falling out of the aperture 102 and the slot 66. In this manner, the switch 16 is prevented from being traversed in the direction of arrow 126 shown in FIG. 10 to the prime or off positions 74*a, b*. The off and prime positions 74*a, b* are locked out.

In an aspect of the tool 106, it is contemplated that the pin 108 and clip 110 may be separately provided. The gripping portion 112 is an optional feature to provide ease of use. At least one pin 108 and at least one clip 110 may be provided to a medical professional along with the controller 10.

In an aspect of the valve 20, alternative configurations are contemplated to open and close the valve. By way of example and not limitation, to close the valve, the first seal 28 may be interposed between the offset inlet 24 and outlet 26. The fluid flowing from the inlet 24 flows in the gap between the piston 32 and the cylinder 30. The second seal 60 prevents the fluid from exiting out of the cylinder 30 and wetting other components of the controller 10. To open the valve 20, the first seal may be displaced upward such that both the first and second seals 28, 60 are disposed on the same side of both the offset inlet and outlet 24, 26. In this manner, the fluid flowing into the cylinder 30 via the inlet 24 fills the interior cavity 44 of the cylinder 30 and exit out of the outlet 26. To close the valve, the first seal 28 is traversed between the offset inlet and outlet 24, 26.

In an aspect of the controller 10, it is also contemplated that the flow rate of the fluid flowing through the controller 10 may be based on a combination of flow rates through two or more of the valves 74*c-e*. To this end, the caming tracks 68*a-c* may be variously configured to accomplish the same.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A variable fluid flow controller for providing a selected flow rate of fluid to a patient, the controller comprising:
    a controller inlet connectable to a fluid source;
    a plurality of valves, each valve having an outlet and an inlet, the inlets of the plurality of valves in fluid communication with the controller inlet, at least two valves of the plurality of valves traversable between an open position for permitting fluid to flow through the valve and a closed position for blocking fluid from flowing through the valve;
    a linearly traversable switch having a earning surface operative to simultaneously traverse at least two of the plurality of valves between the closed position and the open position, the switch sequentially traversable from a first off position to a second prime position, a third flow rate position and a fourth flow rate position wherein a flow rate is zero at the first off position and all valves are traversed to the open position in the prime position;
    a plurality of flow restrictors inline with the plurality of valves, at least two of the plurality of flow restrictors defining different fluid flow rates; and a controller outlet in fluid communication with the outlets of the plurality of valves and fluidically communicable with the patient.

2. The controller of claim 1 wherein the earning surface comprises a first caming track having a first straight configuration adjacent a first valve and a second earning track having a second straight configuration adjacent a second valve for respectively traversing the first valve and the second valve of the plurality of valves between the open position and the closed position upon linear traversal of the switch along a length of the first and second tracks.

3. The controller of claim 1 wherein one valve of the plurality of valves is traversed to the open position and the remaining valves of the plurality of valves are traversed to the closed position.

4. The controller of claim 1 further comprising:
a housing with the plurality of valves contained within the housing;
the switch further comprising a handle portion for linear traversal of the switch, the handle portion disposed external to the housing and attached to the caming surface which is disposed internal to the housing, the earning surface of the switch contained within the housing adjacent to the plurality of valves.

5. The controller of claim 1 wherein the housing has a plurality of locking holes, and the handle portion of the switch has an aperture alignable to one of the plurality of locking holes, and the controller further comprises a locking member selectively insertable into the aperture of the switch and one of the locking holes which the aperture is aligned to one of the locking holes for restricting movement of the switch.

6. The controller of claim 1 wherein a flow rate of the fourth flow rate position is greater than a flow rate of the third flow rate position but lower than a flow rate of the second prime position.

7. A variable fluid flow controller for providing a selected flow rate of fluid to a patient, the controller comprising:
a controller inlet connectable to a fluid source;
a plurality of valves, each valve having an outlet and an inlet, the inlets of the plurality of valves in fluid communication with the controller inlet, at least two valves of the plurality of valves traversable between an open position for permitting fluid to flow through the valve and a closed position for blocking fluid from flowing through the valve;
a switch having a earning surface operative to traverse only one of the plurality of valves to the open position and the remaining valves to the closed position, the switch being sequentially traversable from a first off position to a second prime position, a third flow rate position and a fourth flow rate position, a flow rate being zero at the first off position, the swtich being traverseable between the first off position and the third flow rate position only after being traversed to the second prime position;
a plurality of flow restrictors in line with the plurality of valves, at least two of the plurality of flow restrictors defining different fluid flow rates; and
a controller outlet in fluid communication with the outlets of the plurality of valves and fluidically communicable with the patient;
wherein the switch is linearly traversable from the first off position to the second prime position, the third flow rate position and the fourth flow rate position.

8. The controller of claim 7 wherein a flow rate of the fourth position is greater than a flow rate of the third flow rate position but lower than a flow rate of the second prime position.

9. The controller of claim 7 wherein all of the plurality of valves are traversed to the open position in the prime position.

* * * * *